Nov. 23, 1948. H. H. MERWIN ET AL 2,454,329
TAKEUP MECHANISM
Filed Nov. 28, 1947 4 Sheets-Sheet 1

INVENTORS
H.H. MERWIN
A.C. NYSTROM
BY
W.C. Parnell
ATTORNEY

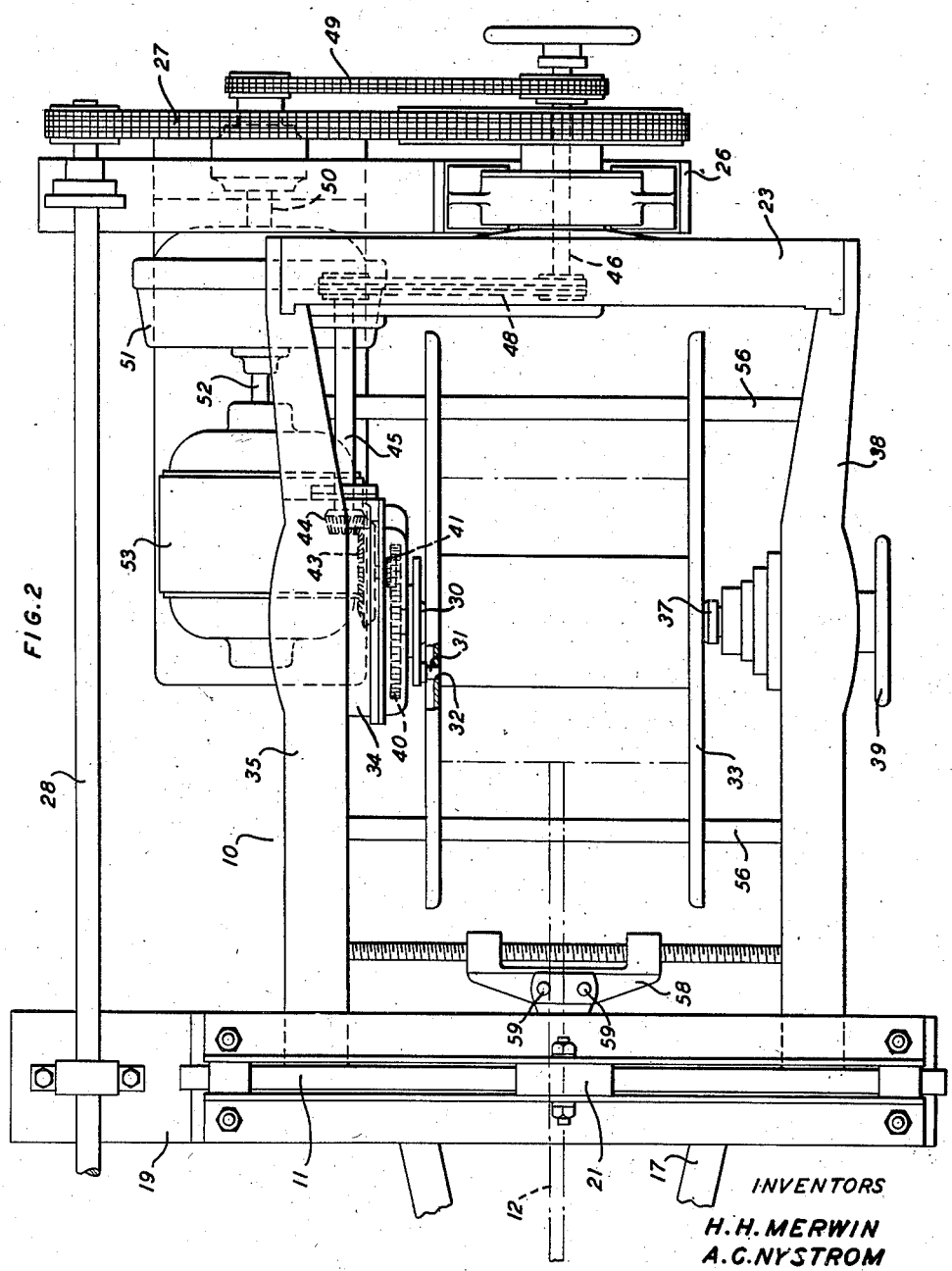

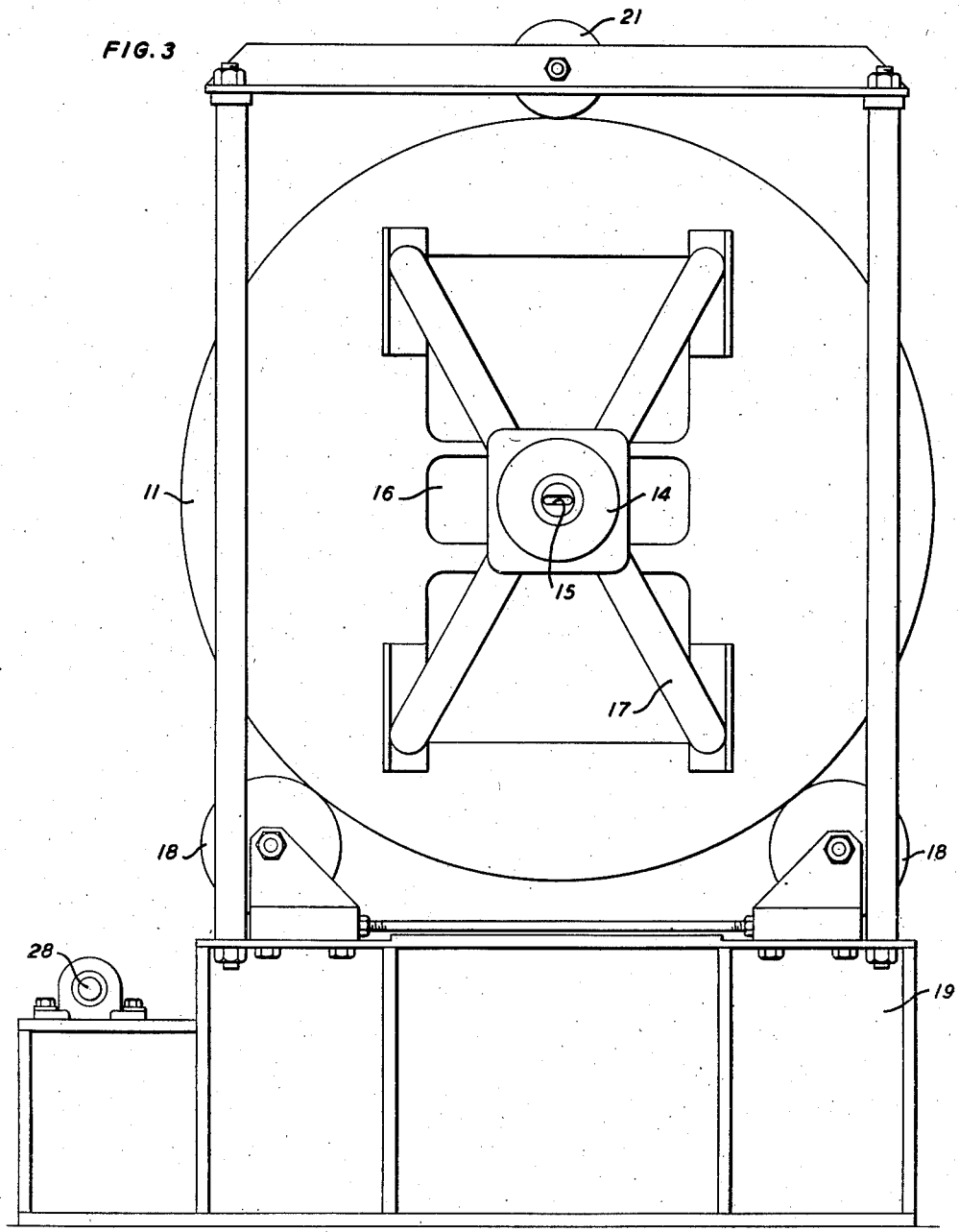

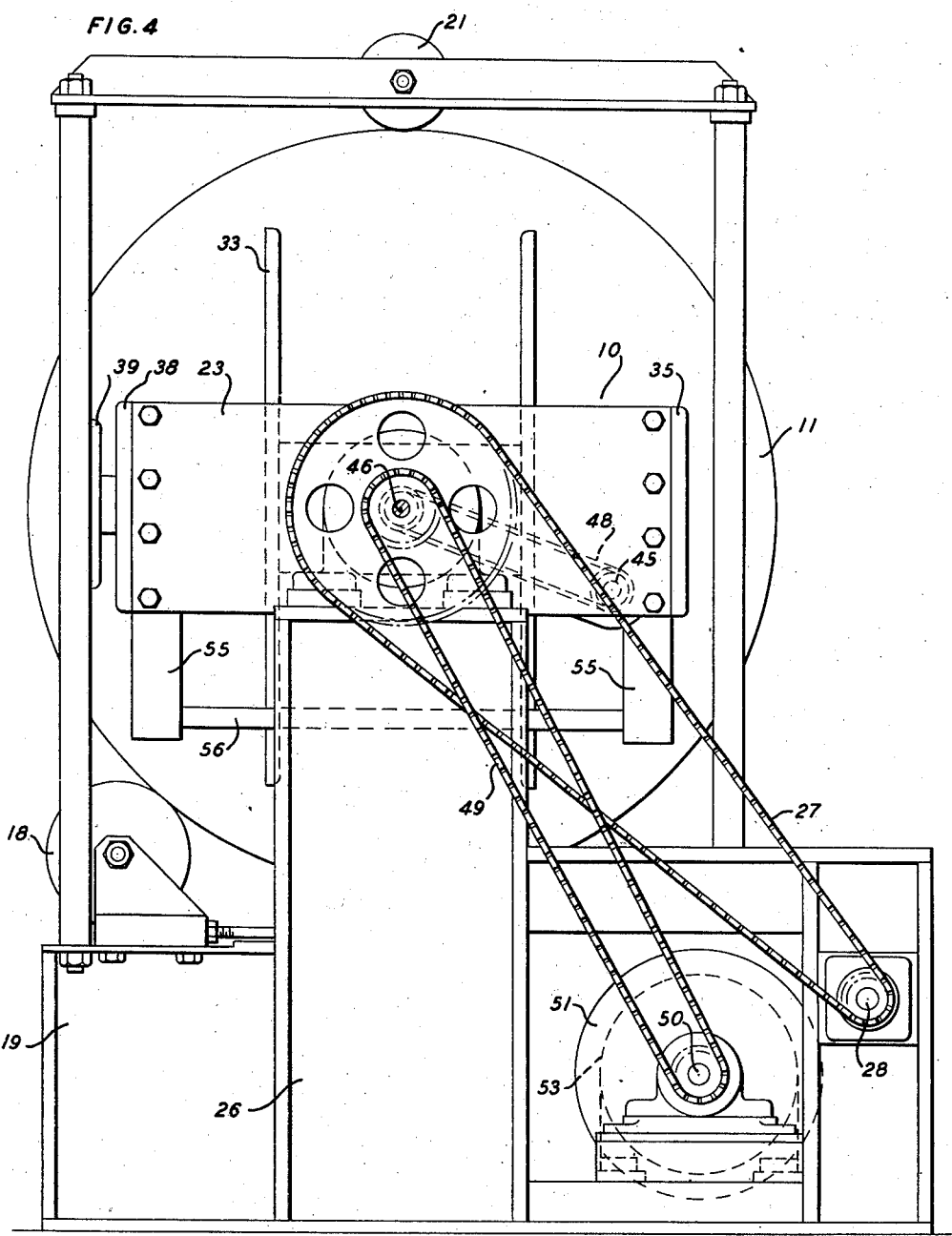

Patented Nov. 23, 1948

2,454,329

UNITED STATES PATENT OFFICE 2,454,329

TAKE-UP MECHANISM

Harry H. Merwin and Axel C. Nystrom, Rutherford, N. J., assignors to Western Electric Company, Incorporated, New York, N. Y., a corporation of New York Application November 28, 1947, Serial No. 788,466

3 Claims. (Cl. 57—69)

This invention relates to takeup mechanisms, and more particularly to takeup mechanisms for cable stranding machines.

Cable stranding machines are composed of numerous units depending upon the material employed to construct the cable. Initially, a selected number of insulated electrical conductors are withdrawn from supply reels and advanced through units where insulating coverings are wound spirally on the conductors to complete the cable. The final unit in a stranding or cable forming machine of this type includes a takeup mechanism supporting a takeup reel which must be driven about its axis to wind the completed cable thereon, and about an axis at right angles to its own axis to cause the group of insulated electrical conductors to be rotated while advanced longitudinally through the various units whereby the insulating materials will be wound spirally thereon.

An object of the present invention is to provide a takeup mechanism which is simple in structure, efficiently operable and highly practical for advancing material longitudinally, rotating it about the center of its path of advancement and winding the material on a takeup reel.

With this and other objects in view, the invention comprises a takeup mechanism having a cradle with relatively movable centers to support a takeup reel for rotation about its axis, the cradle including means to support the reel in a given position adjacent the centers before and after the reel is mounted between the centers.

More specifically, the supporting means for the reel includes spaced parallel bars to locate the hubs of the reel substantially in alignment with the cone centers whereby relative movement of the cone centers will cause lateral movement of the reel on the bars and lifting of the reel from the bars as the cone centers are moved into the hubs of the reel. Furthermore, the bars are positioned to receive the reel after the reel is filled and the cone centers are removed from the hubs thereof. The cradle is formed with a hollow spindle at one end and a disc-like wheel at the other end, the wheel being centrally apertured for the advancement of the material or cable therethrough to be wound on the takeup reel. The spindle is driven to rotate the cradle about its axis, which is at right angles to the axis of the reel and at the same time a driving means, extending through the hollow spindle, rotates the takeup reel about its axis.

Other objects and advantages will be apparent from the following detailed description when considered in conjunction with the accompanying drawings, wherein Fig. 1 is a front elevational view of the takeup mechanism, portions thereof being shown in section;

Fig. 2 is a top plan view of the takeup mechanism;

Fig. 3 is an end elevational view of the takeup mechanism looking from the left of Fig. 1; and Fig. 4 is an end elevational view of the takeup mechanism, looking from the right of Fig. 1.

Figure 1:
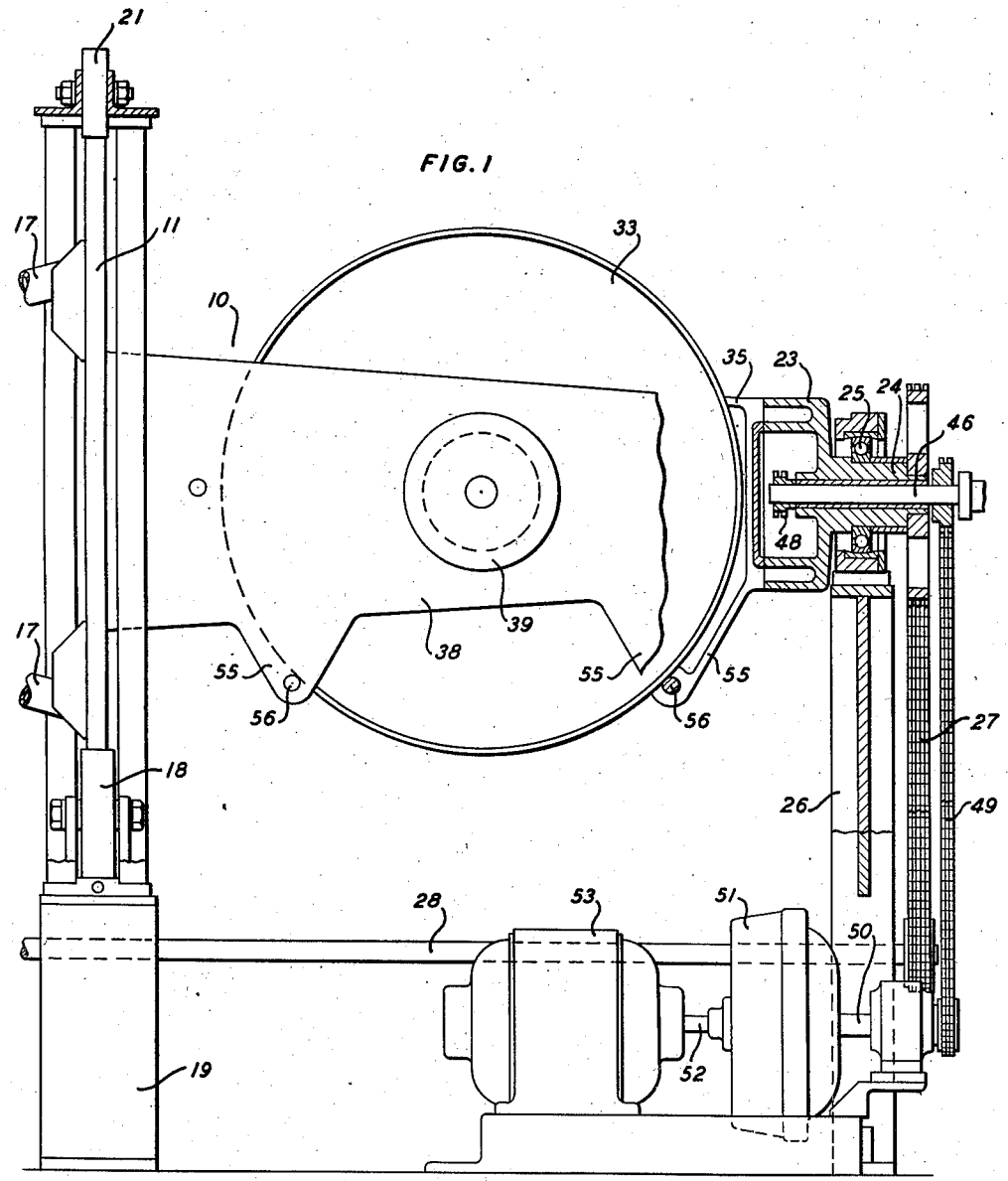

Referring now to the drawings, the takeup mechanism includes a cradle indicated generally at 10, which has a disc-like wheel 11 mounted at one end thereof and is centrally apertured to receive a material 12 which in the present embodiment of the invention is a switchboard cable formed of a plurality of insulated electrical conductors and covered with suitable insulating material. A material guide 14, with a central aperture 15 disposed in alignment with the central opening 16 of the wheel 11, is supported by a frame 17 carried by the wheel. The wheel 11 is supported for rotation by rollers 18 mounted on a vertical frame 19 as illustrated in Figs. 1 and 3. A top roller 21 cooperates with the rollers 18 to hold the wheel in a given position while rotating.

The opposite end 23 of the cradle 10 is formed with a hollow spindle 24 supported in a bearing 25 which is mounted in a vertical frame 26. The spindle 24 is driven by a sprocket and chain connection 27 from a main drive shaft 28 which is driven by a suitable power means (not shown).

A cone center 30 provided with a locking pin 31 to enter an aperture 32 in the adjacent head of a takeup reel 33 is supported in its driving unit 34 which in turn is mounted in the side 35 of the cradle 10. A movable cone center 37 is supported by the side 38 of the cradle 10 and through the aid of a hand wheel 39 this cone center may be moved relative to the driving cone center 30 to cause the cone centers to enter the hubs of the reel 33 to support the reel for rotation about the axis of the cone centers. In the unit 34 a gear 40 is mounted on a spindle portion of the cone center 30 and is driven by a pinion 41. The pinion 41 is mounted on a shaft with a beveled gear 43 which is driven by a beveled gear 44 mounted on a shaft 45. A shaft 46 journalled in the hollow spindle 24 (Fig. 1) is operatively connected to the shaft 45 by a sprocket and chain connection 48. The shaft 46 is provided with a sprocket and chain connection 49 with an output shaft 50 of a conventional hydraulic coupling 51, the input shaft 52 of which is driven by a motor 53, The cradle 10, which is substantially rectangular in general contour, is caused to stop in the position shown in the drawings by a mechanism which is not a part of this invention. The sides 35 and 38 of the cradle have downwardly projecting portions 55 which are apertured to receive the ends of rods 56 disposed at spaced positions upon each side of the cone centers 30 and 37. The purpose of the rods 56 is to support the reel 33 when initially lowered into the carriage 10 and to position the hubs of the reel whereby relative movement of the cone centers 30 and 37 will cause them to enter the hubs and lift the reel free of the supporting rods. The supporting rods are also present to receive and support the reel when it has been filled with the material or cable 12 and released from the cone centers. The material or cable 12 is distributed on the reel during operation of the mechanism by a distributing unit 58 reciprocated between given limits and provided with guide pins 59, positioned upon each side of the material 12.

In preparing the takeup mechanism for operation, an empty reel 33 is lowered into the carriage by a hoist or other suitable means and is positioned upon the supporting rods 56. The hubs of the reel 33 are automatically located in a vertical plane with the axes of the cone centers 30 and 37 with the axis of the reel at this time a short distance below the axes of the centers. The cone center 37, which has been moved to the right to allow for the reel to be positioned in the carriage, is now moved to the left to engage the adjacent hub of the reel, move the reel until the other hub engages cone center 30 and the aperture 32 of the reel is positioned adjacent the locking pin 31. Continued movement of the cone center 37 to the left until the cone centers are seated in the hubs of the reel will result in the reel being raised from the supporting rods 56 where it may be rotated. The leading end of the cable is secured to the reel and located between the guide pins 59 of the distributor unit 58. The mechanism is now in readiness for operation. The main shaft 28 is driven by a suitable means (not shown) to drive the cradle and other units positioned in advance of the takeup mechanism. The drive shaft 28 causes the cradle 10 with the reel 33 to rotate about the cradle axis, which is at right angles to the reel axis, causing rotation of the material about the centerline of its path of advancement. While the cradle rotates, one end including the spindle 24 is supported by the bearing 25, while the other end including the wheel 11 is supported by the rollers 18 assisted by the roller 21.

The motor 53 is energized immediately upon rotation of the cradle 10 to drive the reel. The hydraulic coupling 51 has been previously adjusted depending upon the size of the cable 12 and the torque required to create a predetermined tension in the cable. The driving means between the motor 53 and the reel extends through the hollow spindle 24 and into the carriage where it finally terminates at the cone center 30, which is assisted by the locking pin 31 in driving the reel in a direction to take up the material or cable thereon. When the reel is filled, the mechanism is stopped and the carriage is again located in the position shown in the drawings. The operator may then move the cone center 37 to the right, freeing the reel and allowing it to come to rest upon the supporting rods 56. The cable may then be cut, securing the outer end of the cable to the reel after which the full reel may be removed from the carriage and another empty reel inserted in its place.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A takeup mechanism comprising a cradle, relatively movable centers carried by the cradle to support a takeup reel for rotation about its axis, means in the cradle to support the reel before the reel is mounted between the centers and after it is released from the centers, means to rotate the cradle about an axis extending transversely of the reel axis, and means to simultaneously drive one of the centers to rotate the reel about its axis to wind material thereon.

2. A takeup mechanism comprising a cradle, relatively movable centers carried by the cradle to support a takeup reel for rotation about its axis, spaced bars carried by the cradle and disposed parallel with each other and with the axis of the reel to support the reel for mounting between the centers and to receive the reel when released from the centers, means to rotate the cradle about an axis extending transversely of the reel axis, and means to simultaneously drive one of the centers to rotate the reel about its axis to wind material thereon.

3. A takeup mechanism comprising a cradle having a hollow spindle at one end thereof and a wheel at the other end thereof centrally apertured for longitudinally advancing material to travel therethrough in a given path, means to rotatably support the wheel, means to rotatably support the spindle, means to drive the spindle to rotate the cradle about a given axis, relatively movable centers mounted in the sides of the cradle to support a takeup reel for the material rotatable about its axis which is coincident with the axes of the centers and disposed at an angle with respect to the cradle axis, spaced bars carried by the cradle and disposed parallel with each other and with the axis of the reel to support the reel for mounting between the centers and to receive the reel when released from the centers, and means extending into the cradle through the hollow spindle to drive one of the centers to rotate the reel about its axis to cause winding of the material on the reel during rotation of the cradle.

HARRY H. MERWIN.
AXEL C. NYSTROM.

REFERENCES CITED

The following references are of record in the file of this patent:

UNITED STATES PATENTS

| Number | Name | Date |
|---|---|---|
| 2,287,708 | Reynolds et al. | June 23, 1942 |
| 2,339,871 | Merwin | June 25, 1944 |